(12) United States Patent
Zhao et al.

(10) Patent No.: US 9,851,118 B2
(45) Date of Patent: Dec. 26, 2017

(54) HVAC SYSTEM RELAY AUTOTUNING AND VERIFICATION

(71) Applicant: Carrier Corporation, Farmington, CT (US)

(72) Inventors: Futao Zhao, South Windsor, CT (US); Junqiang Fan, Glastonbury, CT (US); Stevo Mijanovic, South Windsor, CT (US)

(73) Assignee: CARRIER CORPORATION, Farmington, CT (US)

( * ) Notice: Subject to any disclaimer, the term of this patent is extended or adjusted under 35 U.S.C. 154(b) by 582 days.

(21) Appl. No.: 14/390,436

(22) PCT Filed: Mar. 5, 2013

(86) PCT No.: PCT/US2013/028989
§ 371 (c)(1),
(2) Date: Oct. 3, 2014

(87) PCT Pub. No.: WO2013/151646
PCT Pub. Date: Oct. 10, 2013

(65) Prior Publication Data
US 2015/0057812 A1    Feb. 26, 2015

Related U.S. Application Data

(60) Provisional application No. 61/620,584, filed on Apr. 5, 2012.

(51) Int. Cl.
*F24F 11/00* (2006.01)
*G05B 13/02* (2006.01)
(Continued)

(52) U.S. Cl.
CPC ........ *F24F 11/006* (2013.01); *G05B 13/0205* (2013.01); *F24F 1/02* (2013.01); *F24F 11/022* (2013.01); *F24F 2011/0061* (2013.01)

(58) Field of Classification Search
CPC .......... F24F 11/006; F24F 1/02; F24F 11/022; F24F 2011/0061; G05B 13/0205
(Continued)

(56) References Cited

U.S. PATENT DOCUMENTS 5,298,845 A   3/1994  DeBoer et al.
5,341,651 A   8/1994  Inoue
(Continued)

FOREIGN PATENT DOCUMENTS

EP      0915301 A2 *   5/1999  ............ F24F 11/006
GB      2348021 A      9/2000
WO      03081348 A1    10/2003

OTHER PUBLICATIONS

International Search Report and Written Opinion for application PCT/US2013/028989, dated Jan. 7, 2014, 11 pages.

*Primary Examiner* — Ryan Coyer
(74) *Attorney, Agent, or Firm* — Cantor Colburn LLP

(57) ABSTRACT

Systems and methods for autotuning a HVAC system controller. The method may include receiving a performance coefficient and providing a step-input using an autotuner relay to measure ultimate gain and ultimate period in a controlled HVAC system. The method may also include adjusting the ultimate gain and ultimate period to account for a relay hysteresis, and applying a tuning rule to derive a proportional gain and an integral time for a controller of the HVAC system control loop. The method may further include updating the controller with the proportional gain and integral time, and verifying the proportional gain and integral time. Verifying the proportional gain and integral time may include setting a performance envelope having a tightness related to the performance coefficient, applying a step-input to provoke a closed-loop response, and comparing the closed loop response with the performance envelope to
(Continued)

determine whether the closed-loop response is within the envelope.

15 Claims, 8 Drawing Sheets

(51) Int. Cl.
  *F24F 1/02* (2011.01)
  *F24F 11/02* (2006.01)
(58) Field of Classification Search
  USPC .......................................................... 700/276
  See application file for complete search history.

(56) References Cited

U.S. PATENT DOCUMENTS

| | | | |
|---|---|---|---|
| 5,355,305 A | 10/1994 | Seem et al. | |
| 5,506,768 A | 4/1996 | Seem et al. | |
| 5,568,377 A | 10/1996 | Seem et al. | |
| 5,769,314 A | 6/1998 | Drees et al. | |
| 5,875,109 A * | 2/1999 | Federspiel | F24F 11/006 700/40 |
| 6,369,716 B1 | 4/2002 | Abbas et al. | |
| 6,554,198 B1 | 4/2003 | Hull | |
| 6,647,318 B2 | 11/2003 | Salsbury | |
| 6,937,909 B2 | 8/2005 | Seem | |
| 7,003,379 B2 | 2/2006 | Tanaka | |
| 7,024,336 B2 | 4/2006 | Salsbury et al. | |
| 7,117,045 B2 | 10/2006 | Hittle et al. | |
| 7,346,403 B2 | 3/2008 | Tanaka | |
| 7,395,125 B2 | 7/2008 | Haguet et al. | |
| 7,735,329 B2 | 6/2010 | Martini | |
| 2008/0281439 A1 | 11/2008 | Salsbury | |
| 2008/0307811 A1 | 12/2008 | Bryan et al. | |
| 2009/0216380 A1 | 8/2009 | Kolk | |
| 2010/0198370 A1 | 8/2010 | Salsbury | |
| 2011/0016893 A1 | 1/2011 | Dawes | |
| 2011/0029100 A1 | 2/2011 | Seem et al. | |
| 2011/0190909 A1 | 8/2011 | Salsbury | |
| 2013/0197676 A1* | 8/2013 | Salsbury | G05B 13/02 700/32 |

* cited by examiner

HVAC SYSTEM RELAY AUTOTUNING AND VERIFICATION

CROSS-REFERENCE TO RELATED APPLICATIONS

This application claims priority to U.S. Provisional Patent Application Ser. No. 61/620,584, filed on Apr. 5, 2012. The entirety of this priority document is incorporated herein by reference.

BACKGROUND

Proportional-integral (PI) feedback control can be used to regulate disturbances and achieve desired setpoints in HVAC systems. One example of a component in an HVAC system that can use such PI feedback control is a fan coil unit (FCU), which can regulate fan speed, cooling/heating medium flow, and/or other variables to meet desired temperature of a zone. The PI parameters, proportional gain and integral time can, however, be difficult to determine and pre-set, prior to commissioning of the HVAC system. Further, when implemented, such HVAC systems and components can be affected by a variety of time-dependent variables that often make a single set of PI parameters unsuitable for indefinite use. As a result, PI parameter re-tuning is often desired, allowing the controller to respond to changes in the characteristics of the system.

To provide such dynamic system control, the HVAC system controllers may be re-tuned while online. Tuning may be manual, proceeding by trial-and-error, or may be automatic. Manual tuning is often time consuming and can lead to sub-optimal results, for example, by introducing human error. Further, automatic tuning or "autotuning" is frequently inaccurate and/or unreliable. If a process disturbance occurs during such autotuning, the controller can erroneously set the PI parameters as if the transitory disturbance was part of the system cause-effect response. Further, system models, often used to estimate the tuning parameters from information measured in the system, can be difficult to identify online.

What is needed are systems and methods for autotuning an HVAC system controller.

SUMMARY

Embodiments of the disclosure may provide an exemplary method for autotuning an HVAC system controller. The method may include receiving a performance coefficient, and providing a step-input using an autotuner relay to measure an ultimate gain and an ultimate period in a controlled HVAC system. The method may also include adjusting the ultimate gain and the ultimate period to account for a relay hysteresis, and applying a tuning rule to derive a proportional gain and an integral time for a controller of the HVAC system control loop. The method may further include updating the controller with the proportional gain and integral time, and verifying the proportional gain and integral time. Verifying the proportional gain and integral time may include setting a performance envelope having a tightness related to the performance coefficient, applying a step-input to provoke a closed-loop response, and comparing the closed loop response with the performance envelope to determine whether the closed-loop response is within the envelope.

Embodiments of the disclosure may provide an exemplary HVAC system. The HVAC system may include a fan coil unit including a fan and a heat exchange coil, a duct extending between the fan coil unit and a volume of air, and a sensor disposed in or proximal to the volume of air and configured to sense the air temperature of a certain zone. The HVAC system may also include a controller coupled to the fan coil unit and the sensor and configured to receive a signal from the sensor and provide a signal to the fan coil unit so as to regulate the air temperature of a certain zone. The controller may include an input device that is selectable to provide a performance coefficient to the controller so as to provide a performance envelope to verify a controller autotuning result.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Figure 1:
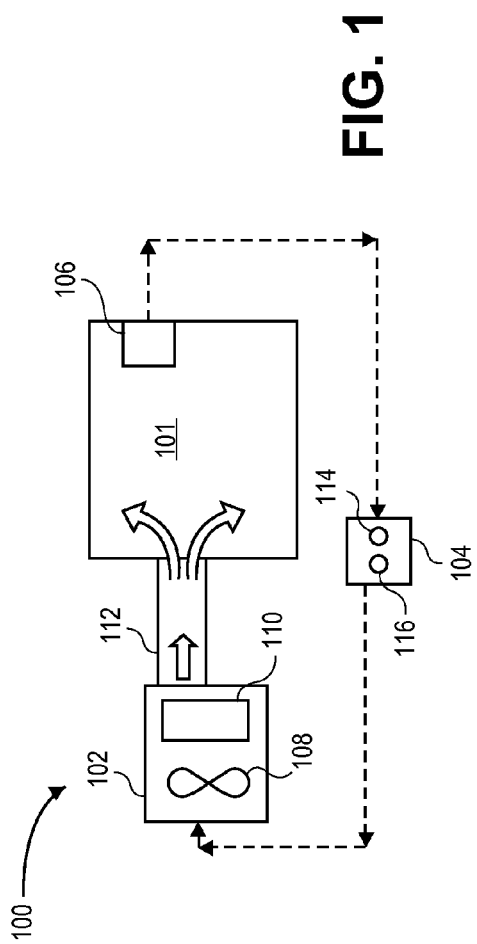
FIG. 1 illustrates a schematic view of an exemplary HVAC system, according to an embodiment.

FIG. 1 illustrates a schematic view of an exemplary HVAC system 100, according to an embodiment. The HVAC system 100 is configured to chill and/or heat air supplied to a volume or "zone" 101, which may be a facility, room, or portion thereof. In an exemplary embodiment, the HVAC system 100 includes a fan coil unit (FCU) 102, a controller 104, and a sensor 106. It will be appreciated that a variety of other HVAC systems 100 may be employed, without departing from the scope of the present disclosure. Further, in the illustrated embodiment, the FCU 102 may include a fan 108 and a coil 110. The fan 108 may be any suitable axial, radial, or centrifugal fan or blower, and the coil 110 may be any suitable heat exchanger, such as a heat exchange coil. Further, the coil 110 may form part of a heat pump or other refrigerant cycle so as to heat or cool air pushed across the coil 110 by the fan 108. The FCU 102 may be configured to supply air to the zone 101 via a duct 112, which may be any suitable size and shape and may have one or more inlets and/or one or more outlets, so as to distribute air flow in the zone 101 and/or to direct air to other zones (not shown).

The sensor 106 may be disposed in or proximal to the zone 101 and may be a temperature sensor such as a thermometer, thermistor, or thermocouple, or any other type of sensor. The sensor 106 may thus be configured to sense one or more relevant conditions in the zone 101. The sensor 106 may be coupled to the controller 104 and configured to provide signals thereto indicative of the relevant condition(s) in the zone 101.

The controller 104 may, in turn, be coupled to the FCU 102 and configured to control the speed of the fan 108, the flow rate of heat transfer medium (e.g., water) through the coil 110, other variables, or a combination thereof. The controller 104 may be or include one or more proportional-integral (PI) controllers, proportional-integral-derivative (PID) controllers, and/or the like. Accordingly, the controller 104 may receive a signal from the sensor 106 and respond by adjusting the operating parameters of the FCU 102 to achieve a desired setpoint in the zone 101.

Further, the controller 104 may have one, two, or more input devices, for example, at least a first input device 114 and a second input device 116, as shown. The first input device 114 may be, at least conceptually, a switch, configured to signal to the controller 104 that autotuning is desired. Accordingly, the first input device 114 may be a manual switch, toggled by an operator, or may be a time delay switch, configured to start the autotuning process at set intervals. The second input device 116 may be a knob, dial, digital input, or may instead be a constant, pre-determined according to end-user needs or other factors. The second input device 116 may provide an acceptable performance coefficient α to the controller 104, which may be employed during autotuning to set an acceptable performance envelope "tightness," as will be described in greater detail below.

Figure 2:
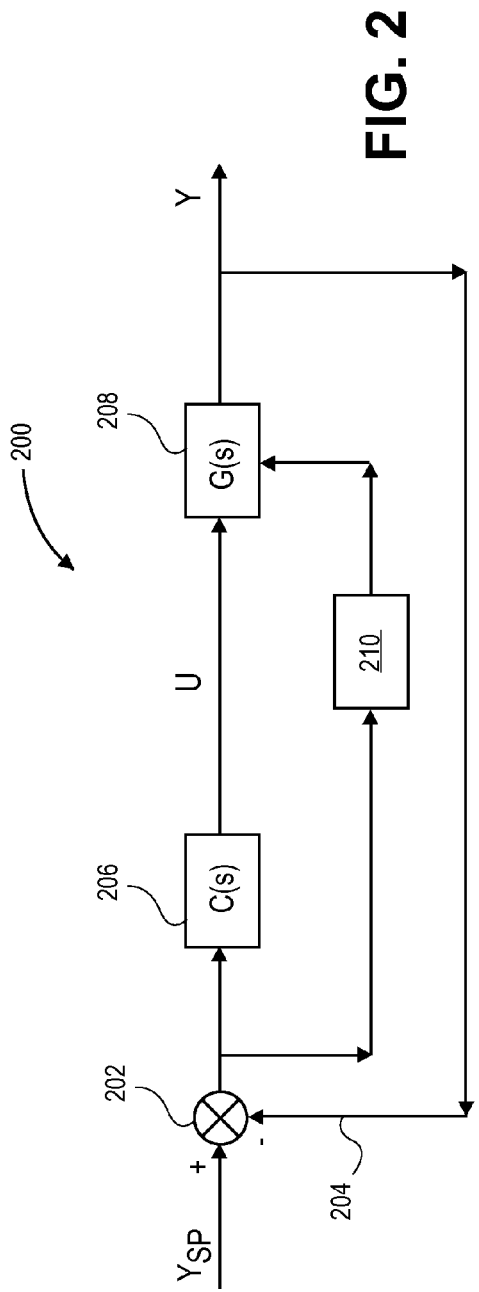
FIG. 2 illustrates an exemplary block diagram of a control feedback loop with a PI controller, according to an embodiment.

FIG. 2 illustrates a control block diagram of an exemplary control loop 200 for an HVAC system, such as the HVAC system 100, described above. The control loop 200 may include a setpoint input Ysp, which is fed to a signal comparator 202, where the setpoint input Ysp is compared to a feedback signal via line 204. The result, an "error" signal, is indicative of the difference between the setpoint input Ysp and the feedback signal via line 204. The error signal is then fed to a controller 206, which applies a control function C(s) to derive an output U. The controller 206 may be a PI controller, a PID controller, a combination thereof, or the like and may form part of or include the controller 104 (FIG. 1), for example.

The output U is then fed to a component or "controlled system" 208, which may be or include the FCU 102 and/or another component. The controlled system 208 reacts to the output U and generates an output signal Y. The output signal Y is then fed back to the signal comparator 202 via the line 204.

The control loop 200 may also include an autotuner relay 210 disposed in parallel with the controller 206. The autotuner relay 210 may be selectively engaged, for example, when a signal to start the autotuning is received from the first input device 114 (FIG. 1). When engaged, the autotuner relay 210 may take over control of the control loop 200 from the controller 206 and provide a periodic step function to the controlled system 208. By application of the step function, the autotuner relay 210 may determine a limit cycle of the controlled system 208, and thus the ultimate gain Ku and the ultimate period Pu thereof. As will be more fully described below, with knowledge of the ultimate gain Ku and ultimate period Pu, and any adjustment as necessary, for example, as provided herein and described below, the PI parameters of proportional gain Kc and integral time τ can be determined, so as to tune the controller 206.

Figure 3:
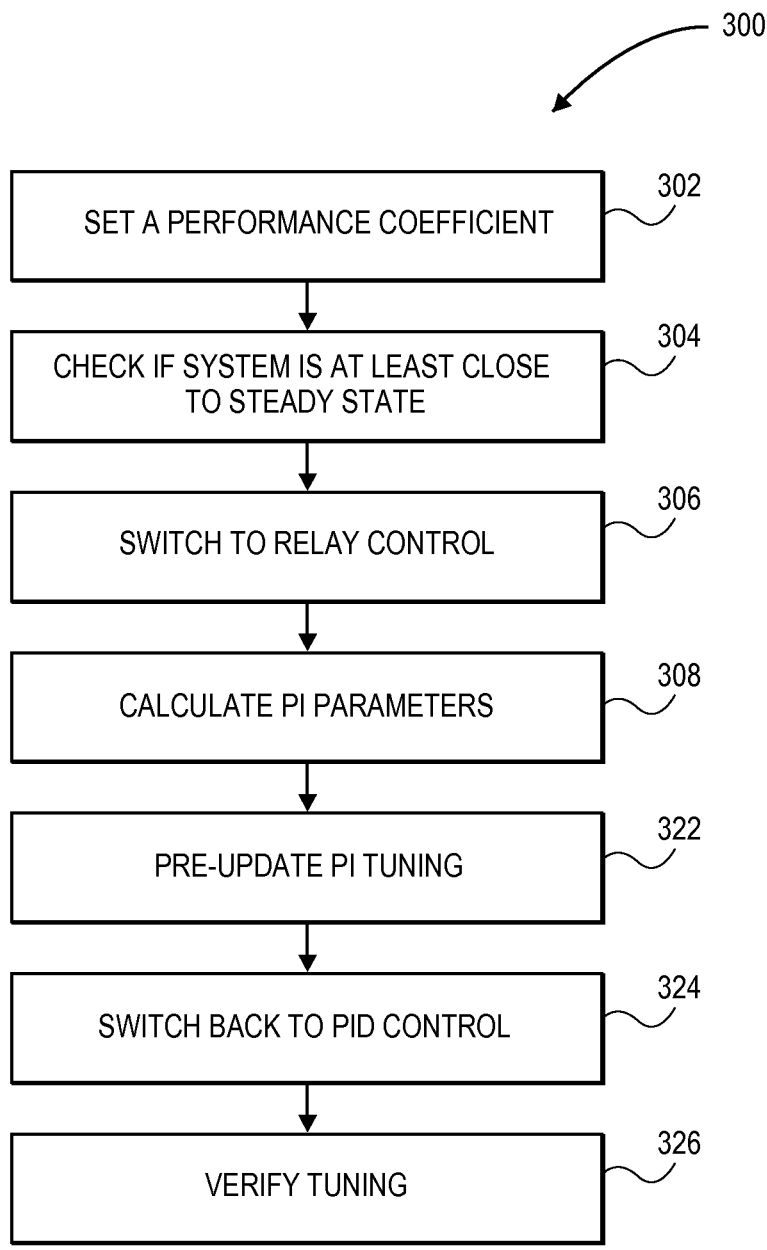
FIG. 3 illustrates a flowchart of an exemplary method for autotuning a controller, according to an embodiment.

With additional reference to FIGS. 1 and 2, FIG. 3 illustrates an exemplary method 300 for autotuning a controller, i.e., determining and setting PI parameters, according to an embodiment. In an exemplary embodiment, the method 300 may be used to estimate a point on a Nyquist plot of the controlled system 208 where the phase lag is $-\pi$.

The method 300 may begin by setting the performance coefficient α, as at 302. The performance coefficient α may be used to determine the maximum overshoot Mp and acceptable damping ratio ζ, as will be described in greater detail below. Setting the performance coefficient α at 302 may include receiving the coefficient α as an input from a user (e.g., via the second input device 116, shown in FIG. 1), for example, during maintenance, at scheduled intervals, or may be coded or wired into the controller 104 as a constant.

The method 300 may then proceed to checking to see if the controlled system 208 is presently operating at or close to steady state, as at 304. One way to perform such checking at 304 may be to compare a previous number of outputs Y and U, to determine if they are within a certain range. For example, the previous about 100, 1000, 10000, or more outputs Y and U may be checked.

The method 300 may then proceed to switching to relay control, as at 306. Switching the control loop 200 of the HVAC system 100 to relay control at 306 may cause the autotuner relay 210 to take over from the controller 206 in the control loop 200. The method 300 may then proceed to calculating the PI parameters, e.g., proportional gain Kc and integral time τ, as at 308 by relay feedback autotuning.

Figure 4:
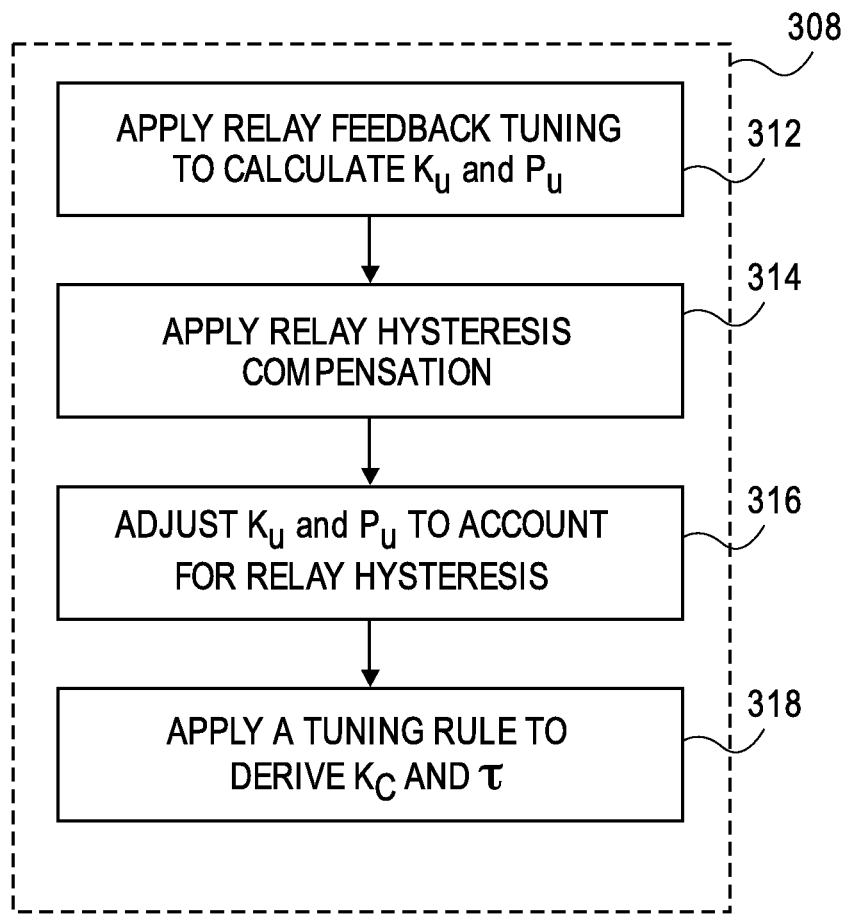
FIG. 4 illustrates a flowchart of an exemplary embodiment of calculating PI parameters in an embodiment of the method for autotuning the controller.

Referring now additionally to FIG. 4, there is shown a flowchart of an exemplary embodiment of calculating the PI parameters, as at 308, of an embodiment of the method 300. For example, calculating the PI parameters at 308 may include continuing the application of the relay control, originated during the switching at 306 (FIG. 3), so as to calculate an ultimate gain Ku and ultimate period Pu of the controlled system 208, as at 312. The dynamics of control loops for a wide range of HVAC systems may be approximated according to a first order plus dead time (FOPDT), whereby:

$$G(s) = \frac{Ke^{-Ds}}{Ts+1} \quad (1)$$

In equation (1), K is the process gain, T is the time constant, and D is the time delay. For HVAC system 100 components such as the zone 101 (FIG. 1), the ratio of the system time delay to the time constant (D/T) may be assumed to be between about 0.1 and about 0.5; however, in some situations, an acceptable D/T ratio may span a wider range, for example, between about 0.1 and about 1 or greater. It will be appreciated that as D/T ratios exceed about 1, tuning may have an attenuated impact in some systems.

The application of a relay step function may produce sustained limit cycles in the controlled system 208. Such sustained limit cycles may be considered present when the periods of the latest two limit cycles are within about 30% of each other. As an illustrative example, the step function may initially have a positive output change with magnitude h, until the controlled system 208 response crosses its setpoint. At this time, the autotuner relay 210 may reverse (or reduce or zero) its output change with magnitude −h, until the controlled system 208 output Y comes back and crosses its setpoint again. Repetition of this step function application can generate limit cycles, in which the ultimate frequency $\omega_u$ is the frequency of the oscillation of the controlled system 208, as just described, while the ultimate gain is:

$$K_u = \frac{4h}{\pi a} \quad (2)$$

In equation (2), a is the magnitude of oscillation of the controlled system 208, and h is the amplitude of the step function applied by the autotuner relay 210. In various embodiments consistent with use in HVAC systems, h may be between about 5% and about 10% of the control output scale. Further, the control error $\epsilon$ may be set at between about 2 and about 5 times the measurement of the noise covariance, which may be determined in any suitable way.

Figure 5:
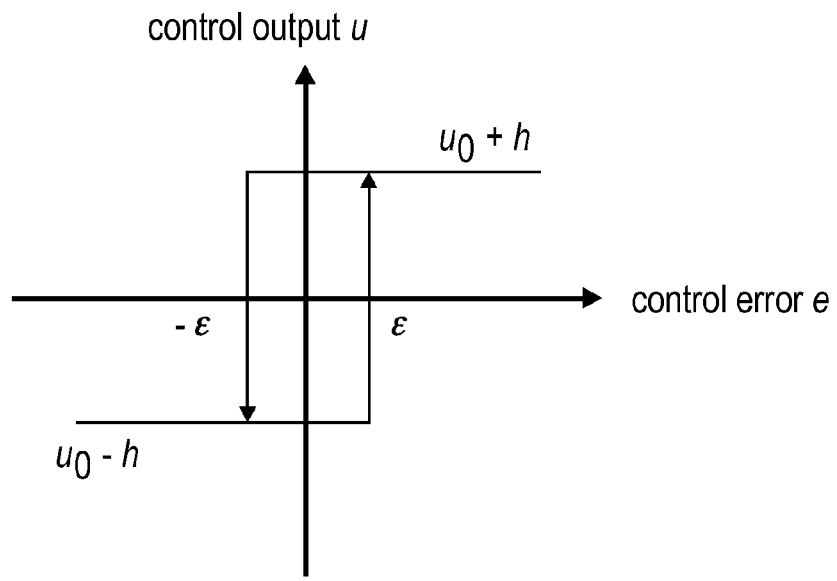
FIG. 5 illustrates a plot of a relay with hysteresis for autotuning, according to an embodiment.

Calculating the PI parameters at 308 may also include applying relay hysteresis compensation, as at 314. Relay hysteresis may be employed to prevent the autotuner relay 210 from switching due to control error signal noise. FIG. 5 illustrates the effect of relay hysteresis, whereby, in the top horizontal line, the control output moves from Uo (the steady state output of the controller 206) plus the amplitude h of the step function, to Uo-h, as the control error proceeds to −$\epsilon$. However, such hysteresis may introduce error to the determination of the ultimate period Pu and ultimate gain Ku. For example, the ultimate gain Ku may be smaller than that of an ideal relay feedback.

Accordingly, calculating the PI parameters at 308 may proceed to adjusting the ultimate gain Ku and the ultimate period Pu, as at 316, to account for the relay hysteresis impact. Generally, the adjustment of the ultimate gain may proceed according to the following equation. Reference may be made to paper by Astrom and Hagglund, *Automatic Tuning of Simple Regulators with Specifications on Phase and Amplitude Margins*, AUTOMATICA, 20, 645-651 (1984), the entirety of which is incorporated herein by reference to the extent consistent with the present disclosure.

$$K'_u = \frac{4h}{\pi\sqrt{a^2-\varepsilon^2}} = \frac{1}{\sqrt{1-(\varepsilon/a)^2}} K_u \quad (3)$$

Furthermore, the ultimate period Pu (and thus, the ultimate frequency) may also be altered. For the FOPDT transfer function G(s) of the controlled system 208, the adjustment to the ultimate gain Ku and ultimate period Pu may be modeled according to the following functions:

$$K'_u = \frac{1}{1-(\varepsilon/a)e^{-D/T}} K_u$$

$$P'_u = \frac{\ln(2e^{D/T}-1)}{\ln\frac{(2e^{D/T}-1)-s/a}{1-\varepsilon/a}} P_u$$

Figure 6:
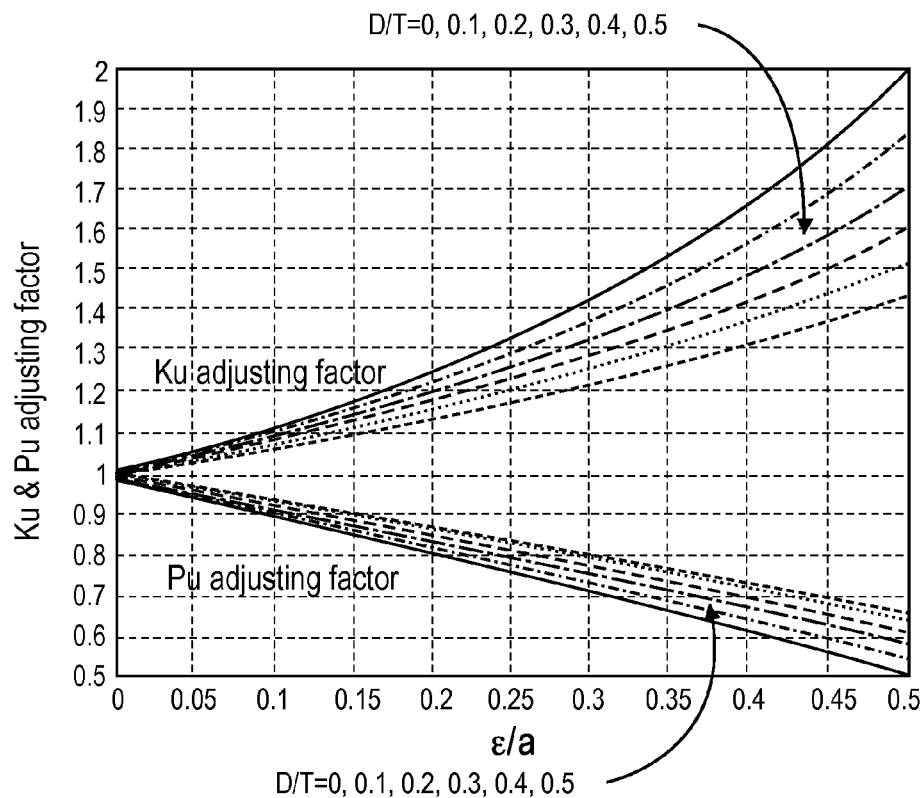
FIG. 6 illustrates a plot of adjustment factors for ultimate gain and ultimate period as a function of a ratio between the time delay (D) and the time constant (T) of the controlled system, according to an embodiment.

FIG. 6 illustrates a plot of the adjusting factor (K'u/Ku and P'u/Pu from equations (4) and (5) above) as a function of $\epsilon$/a and D/T, according to an exemplary embodiment. As can be appreciated, with a larger $\epsilon$/a and smaller D/T, the adjustment factor may increase. However, since the controlled system 208 may be an HVAC system and/or component thereof and may be analytically known to have a D/T of between about 0.1 and about 0.5, the average adjusting factors may be employed to provide the adjusted ultimate gain K'u and the adjusted ultimate period P'u, without knowing the precise D/T value.

Calculating the PI parameters at 308 may further proceed to applying a tuning rule, such as Ziegler-Nichols (Z-N) to derive the proportional gain Kc and integral time $\tau$, as at 318, from the adjusted ultimate gain K'u and ultimate period P'u. It will be readily appreciated that other tuning rules are within the scope of the present disclosure, such as Tyreys-Luyben.

According to Z-N, the proportional gain Kc and integral time $\tau$ may be readily calculated from the following equations:

$$Kc=Ku/2.2 \quad (6)$$

$$\tau=Pu/1.2 \quad (7)$$

Calculating the PI parameters at 308 may then proceed to adjusting the proportional gain Kc and the integral time $\tau$ using internal model control (IMC) results. For a known process model (e.g., such as an HVAC system), tuning parameters can be derived for a wide variety of transfer function models. One such IMC-based tuning formula is Skogestad IMC-based tuning, where the PI controller transfer function is $$C(s)=Kc(1+1/\tau s) \quad (8)$$

Skogestad's IMC-based PI tuning rule for a FOPDT system is:

$$Kc=T/2KD, t=\min(T,8D) \quad (9)$$

One embodiment of Skogestad's IMC-based tuning is described in Skogestad, *Simple Analytic Rules for Model Reduction and PID Controller Tuning*, J. OF PROCESS CONTROL, 13, 291-309 (2003), the entirety of which is incorporated herein by reference, to the extent consistent with the present disclosure. Comparison of the tuning results from applying the tuning rule at 318, with those derived from the IMC results may provide good setpoint tracking and disturbance rejection.

Figure 7:
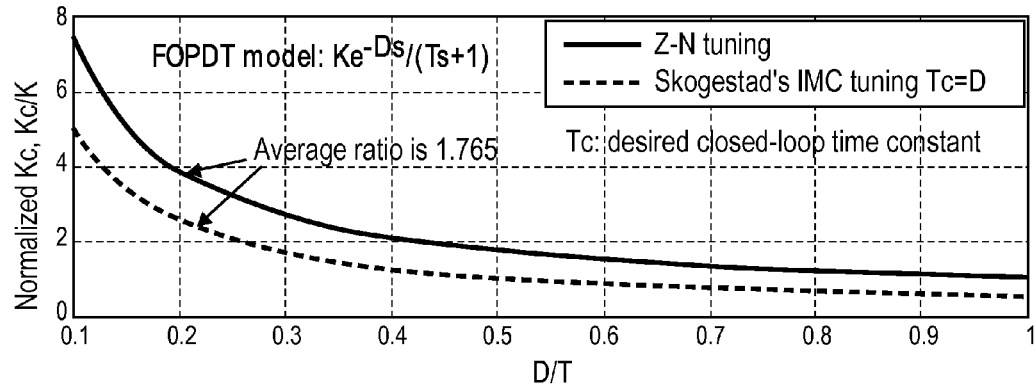
FIG. 7 illustrates a plot of proportional gain derived from a tuning rule as compared to internal model control based results, according to an embodiment.
Figure 8:
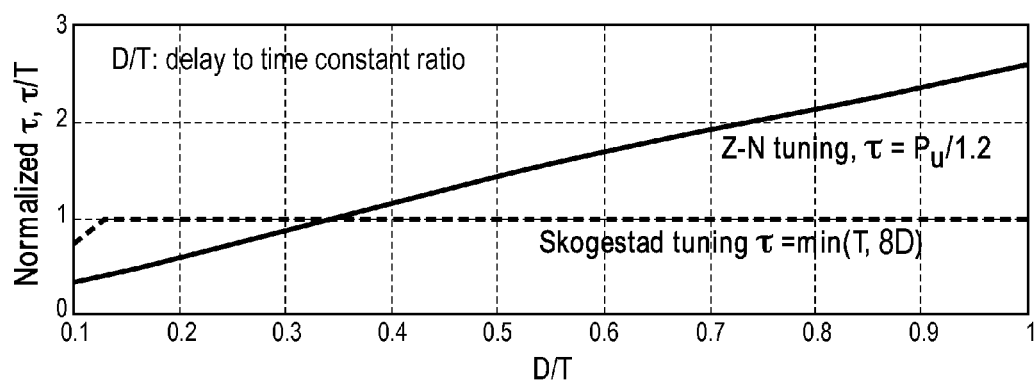
FIG. 8 illustrates a plot of integral time derived from a tuning rule as compared to internal model control based results, according to an embodiment.

FIGS. 7 and 8 illustrate an exemplary plot of proportional gain Kc as a function of D/T and integral time τ as a function of D/T, as derived from the tuning rule at 318 and from the IMC-based tuning. As shown, where D/T is between about 0.1 and about 0.5, the Z-N tuning rule derived proportional gain Kc is about 76.5% higher on average, while the Z-N tuning rule derived τ is lower when D/T is less than about 0.34, but higher when D/T is greater than about 0.34. Accordingly, when D/T is between about 0.1 and about 0.5, a range for HVAC systems, relay feedback using the tuning results, as at 318, may be compared and adjusted to yield approximately the same results as the IMC-based tuning. As such, the Z-N tuning rule for proportional gain may be adjusted to:

$$Kc = Ku/3.9 \tag{10}$$

Furthermore, as can be appreciated from FIG. 7, 1.2Pu/T is approximately linear in relationship to D/T. Accordingly, for FOPDT with D/T being between about 0.1 and about 0.5, the time delay D may be estimated as $$D \approx 0.3Pu \tag{11}$$

Referring again to FIG. 3, the method 300 may proceed to pre-updating the PI tuning, as at 322. This may include providing the controller 206 with the newly-calculated proportional gain Kc and integral time τ. The method 300 may then proceed to switching back to PI control, as at 324, for example, by bumpless transition. Additionally, the method 300 may include verifying the tuning results, as at 326.

Figure 9:
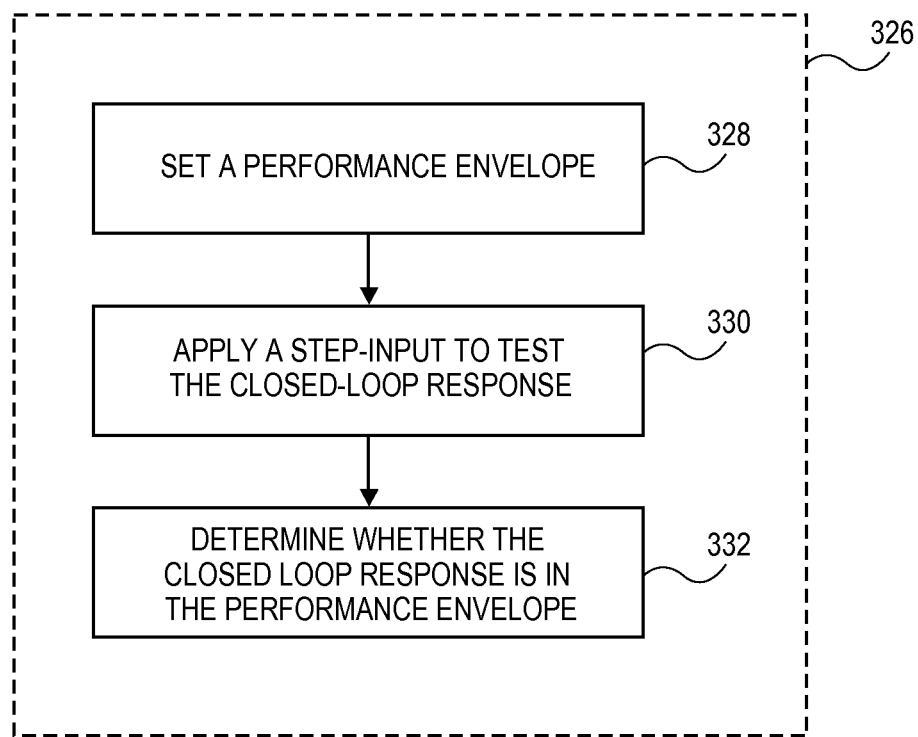
FIG. 9 illustrates a flowchart of an exemplary embodiment of verifying the tuning results in an embodiment of the method for autotuning the controller, according to an embodiment.

Referring now additionally to FIG. 9, a flowchart of an exemplary embodiment of verifying the tuning results at 326 is illustrated. For example, verifying the tuning results at 326 may include setting an envelope, as at 328, providing a step-input to test the closed loop response of the newly-tuned control, as at 330, and determining whether the tuning results in the closed-loop response that is in the envelope, as at 332.

In various systems, the method 300 may be impacted by external deterministic disturbances during execution. Accordingly, verifying the obtained tuning parameters may be desired to avoid inaccurate tuning. The method 300 may thus proceed to setting a performance envelope at 328. The use of a performance envelope may be used in addition to or in lieu of comparing the response characteristics (e.g., decay ratio, settling time, overshoot, etc.) or a combination thereof to a desired value.

Setting the performance envelope at 328 may include deriving boundaries for an acceptable closed-loop response. The closed-loop transfer functions are:

$$Y(s) = \frac{C(s)G(s)}{1 + C(s)G(s)} \cdot Y_{sp} \quad (A = 0) \tag{12}$$

$$U(s) = \frac{C(s)G(s)}{1 + C(s)G(s)} \cdot (-A) \quad (\text{No } Y_{sp} \text{ change}) \tag{13}$$

It will be appreciated from equations (12) and (13) that the closed-loop transfer function is the same between Y and Ysp and U and (−A); therefore, the method 300 may include observing output U response to assess the control tuning results. To observe the closed loop output U response, a step disturbance A may be applied, as at 330, for example, by adding a bias to the controller integral term, i.e., adding the step disturbance A between the controller 206 and the controlled system 208 in FIG. 2. This perturbation may allow the controlled system 208 to return to its previous steady state after the test.

Figure 10:
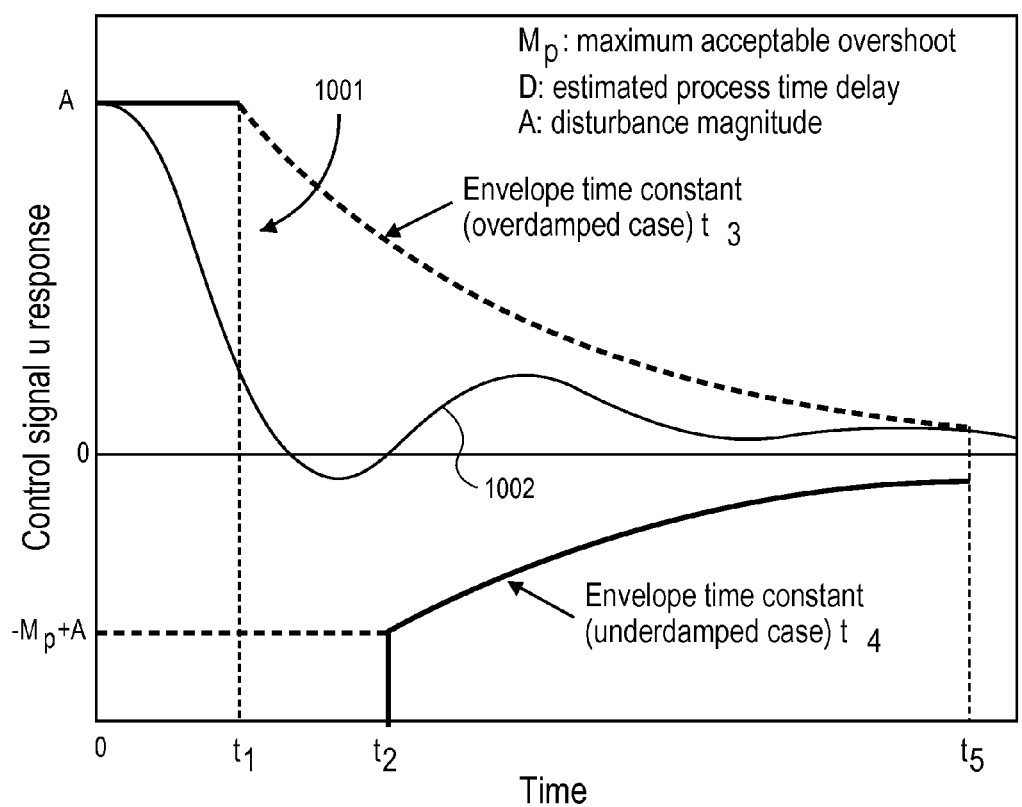
FIG. 10 illustrates a plot of a closed loop response in a performance envelope, for verifying the tuning results, according to an embodiment.

FIG. 10 illustrates an exemplary control response and performance window or "envelope" 1001 of acceptable closed-loop responses 1002, according to an embodiment. The envelope may be established using a maximum acceptable overshoot Mp, which may link gain margin and phase margin through the damping ratio. The input and calculation of the maximum acceptable overshoot will be described below.

Further, the envelope may be defined by several time points, for example, time points $t_1$, $t_2$, $t_3$, $t_4$, as shown in FIG. 10. The first time point $t_1$ may be a time that is reasonably close to, but greater than, the apparent time delay D. For example, the first time point $t_1$ may be about 1.5 D. The second time point $t_2$ may be set such that maximum overshoot occurs between the first and second time points $t_1$ and $t_2$; accordingly, if the overshoot is higher than acceptable, the response may be outside of the envelope between the first and second time points $t_1$ and $t_2$. As such, the second time point $t_2$ may be the time delay plus peak time, i.e.:

$$t_2 = D + \frac{\pi}{\omega_n \sqrt{1 - \zeta^2}} \tag{14}$$

In equation (14), the $\omega_n$ is the natural frequency ζ and is the damping ratio. Estimation of $\omega_n$ and ζ will be discussed below.

The third time point $t_3$ may be the time constant of an exponential term that determines how sluggishly the closed-loop response moves toward its steady state. The desired time constant may be D, based on the tuning target; however, to detect an overly-sluggish response, the time point $t_3$ may be set to about 3 D. The fourth time point $t_4$ sets a boundary to detect an under-damped case. If the closed loop response is under-damped, the transient response along the overshoot side may be bounded by a curve which has an exponential term determining how fast the response is required to move to its steady state. Further, the fifth time point $t_5$ may provide response monitoring time, which may be about equal to D+3($t_3$) for over-damped response and D+3/$\omega_n$ζ for under-damped response.

To determine the second time point $t_2$ from the equation (14) above, the natural frequency must be determined Since the natural frequency $\omega_n$, of a closed-loop response depends on both the controlled system and the control tuning, it may be estimated. Referring to equations (1) and (8), the closed-loop transfer function between A and U may be:

$$\frac{U}{A} = -\frac{KK_C(\tau s + 1)e^{-Ds}}{\tau s(Ts + 1) + KK_C(\tau s + 1)e^{-Ds}} \tag{15}$$

For relay feedback autotuning, the proportional gain Kc may be determined by equation (10); however, the integral time τ may be greater or smaller than the process time constant T, depending on the D/T ratio. As such, the tuned integral time τ may be a too low or too high as compared to IMC tuning for τ=T, where D/T is greater than or equal to about 0.125 or τ=8 D for D/T is less than about 0.125. Accordingly, to estimate the fourth time point $t_4$, the effect of the tuning impact on the natural frequency may be determined, employing three integral time tunings, τ=∞ (no integral action), τ=T (IMC tuning), and τ=D (strong integral time).

In the first case, where $\tau=\infty$, a first-order Pade approximation is used to determine the time delay in the denominator of equation (15), yielding:

$$\frac{U}{A} = -\frac{\frac{KK_C}{TD}(2+Ds)e^{-Ds}}{s^2 + \frac{2T+D-KK_CD}{TD}s + \frac{2(1+KK_C)}{TD}} \quad (16)$$

Therefore, for $0<\zeta<1$, the natural frequency $\omega_n$ and damping ratio $\zeta$ are:

$$\omega_n = \sqrt{\frac{2(1+KK_C)}{TD}}, \text{ and } \zeta = \frac{2T+D-KK_CD}{2\sqrt{2TD(1+KK_C)}} \quad (17)$$

Furthermore, the ultimate frequency $\omega_u$ may be obtained by setting Kc=Ku, which yields:

$$\frac{\omega_n}{\omega_u} = \sqrt{\frac{1+KK_u/3.9}{1+KK_u}} \quad (18)$$

In the second case, where $\tau=T$, equation (15) resolves to:

$$\frac{U}{A} = -\frac{\frac{KK_C}{TD}(2+Ds)e^{-Ds}}{s^2 + \frac{2T-KK_CD}{TD}s + \frac{2KK_C}{TD}} \quad (19)$$

As shown in Table 1, below, the formula for $\omega_n/\omega_u$ and damping ratio $\zeta$ may be known for different cases. Further, in the third case shown below, i.e., where $\tau=D$, first order dynamics may be used to approximate the time delay term in the denominator of equation (15), yielding:

$$\frac{U}{A} = -\frac{\frac{KK_C}{TD}(1+Ds)e^{-Ds}}{s^2 + \frac{1}{T}s + \frac{KK_C}{TD}} \quad (20)$$

The formula for $\omega_n/\omega_u$ and $\zeta$ of this case is also shown in Table 1.

| Tuning Parameters | $\omega_n/\omega_u$ | Damping Ratio $\zeta$ |
|---|---|---|
| Kc = Ku/3.9 | $\sqrt{\frac{1+KK_u/3.9}{1+KK_u}}$ | $\frac{2T+D-DKK_C}{2\sqrt{2TD(1+KK_C)}}$ |
| Kc = Ku/3.9, $\tau$ = T | $\sqrt{\frac{KK_u/3.9}{1+KK_u}}$ | $\frac{2T-DKK_C}{2\sqrt{2TDKK_C}}$ |
| Kc = Ku/3.9, $\tau$ = D | $\sqrt{\frac{KK_u/3.9}{2(1+KK_u)}}$ | $\frac{\sqrt{D/TKK_C}}{2}$ |

Considering a step input disturbance A with amplitude h and $0<\zeta<1$, the time domain response of equation (19) becomes:

$$u(t+D) = U(t+D) + A(t+D) \quad (21)$$

$$= \begin{cases} h, & 0 \leq t+D \leq D \\ he^{-\zeta\omega_n t} \cdot \sqrt{\frac{T^2\omega^2 - 2T\omega\cos\phi + 1}{1-\zeta^2}} \cdot & t+D > D \\ \sin(\omega t\sqrt{1-\zeta^2} - \theta), & \end{cases}$$

where $\phi = tg^{-1}\frac{\sqrt{1-\zeta^2}}{\zeta}$ and $\theta = \sin^{-1}\frac{\sin\phi}{\sqrt{T^2\omega^2 - 2T\omega\cos\phi + 1}}$ Similar to a standard second-order system response, equation (21) shows that the overshoot side is bounded by a curve, defined as:

$$he^{-\zeta\omega_n t} \cdot \sqrt{\frac{T^2\omega^2 - 2T\omega\cos\phi + 1}{1-\zeta^2}}$$

Further, the fourth time point $t_4 = 1/\omega_n\zeta$.

Figure 11:
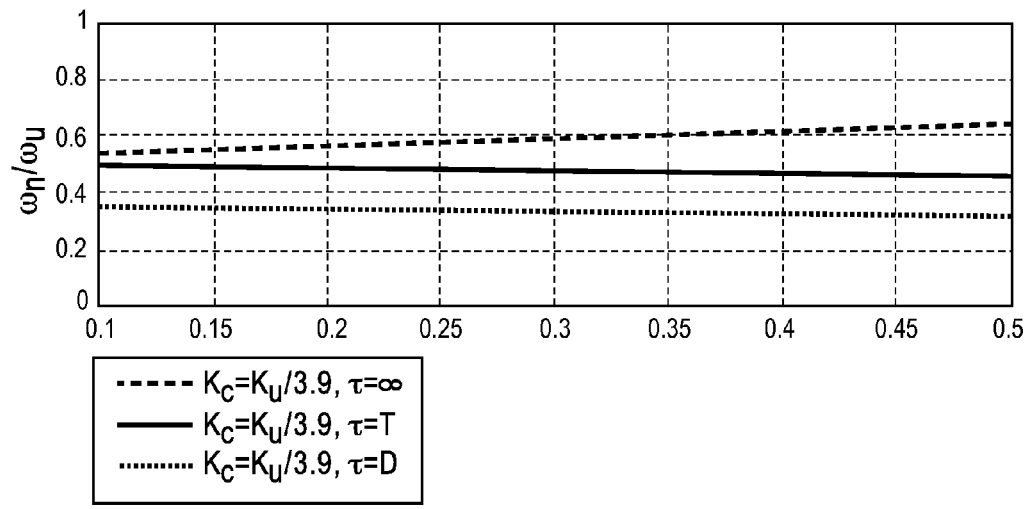
FIG. 11 illustrates a plot of the ratio of natural frequency to ultimate frequency versus D/T for three tuning settings, according to an embodiment.
Figure 12:
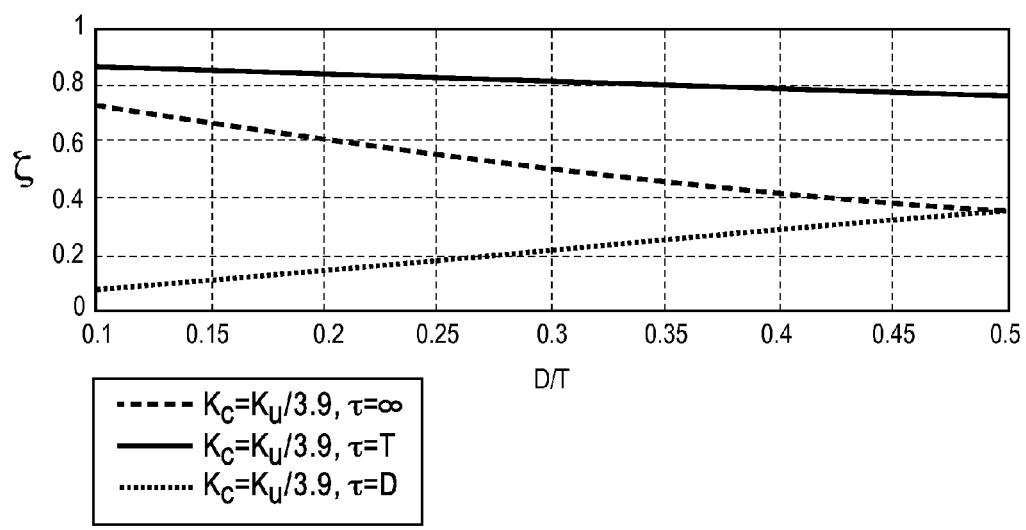
FIG. 12 illustrates a plot of closed-loop damping ratio versus D/T for three tuning settings, according to an embodiment.

FIGS. 11 and 12 illustrate exemplary plots of $\omega_n/\omega_u$ and $\zeta$ for the three integral time settings discussed above, as a function of D/T between 0.1 and about 0.5, and employing the FOPDT approximation. The average $\omega_n/\omega_u$ is thus employed for estimating the fourth time point t4. As illustrated in the FIG. 11, the average $\omega_n/\omega_u$ is about 0.468. Using equation (11) yields:

$$t_4 = \frac{1}{\omega_n\zeta} = \frac{P_u}{0.936\pi\zeta} \approx \frac{1.134D}{\zeta} \quad (22)$$

The maximum acceptable overshoot Mp is related to the damping ratio $\zeta$, such that $$M_p = e^{-\zeta\pi/\sqrt{1-\zeta^2}} \quad (23)$$

Accordingly, the maximum acceptable overshoot Mp setting may be employed to determine the damping ratio for the envelope determination. Such setting, as at 302, may proceed by the user turning a knob, or adjusting a dial, etc., such that a performance coefficient $\alpha$ is determined, such that:

$$Mp = 0.5 - 0.35\alpha \quad (24)$$

$$t_3 = 5D - 3.5\alpha D \quad (25)$$

Where a lower coefficient $\alpha$ corresponds to a looser envelope and a higher coefficient $\alpha$ corresponds to a tighter envelope; accordingly, the performance coefficient $\alpha$ is employed to determine the "tightness" of the performance envelope. The parameters for the envelope may be set as:

$Mp = 0.5 - 0.35\alpha$, with $\alpha$ being an input, which is used to derive the corresponding $\zeta$ $t_1 = 1.5D$ $t_2 = D + \frac{\pi}{\omega_n\sqrt{1-\zeta^2}} \approx 4.6D$ -continued $$t_3 = 5D - 3.5\alpha D$$

$$t_4 = 1.134D/\zeta$$

$$t_5 = \min\{D + 3t_3, D + 3t_4\}$$

Accordingly, with knowledge of each of the variables, and by input of the performance coefficient α, the performance envelope can be set. The closed loop system response can then be compared to the envelope, to determine if the tuning results are acceptable, thereby verifying the results, as at 326.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface being on the top surface of the workpiece, regardless of the orientation of the workpiece.

What is claimed is:

1. A method for autotuning a heating, ventilation and air conditioning (HVAC) system controller coupled to a controlled system, the method comprising:
   receiving a performance coefficient;
   providing a step-input to the controlled system using an autotuner relay to measure an ultimate gain and an ultimate period of the controlled system, the autotuner relay taking control from the HVAC system controller and providing a periodic step function to the controlled system to determine limits of the controlled system, the ultimate gain and the ultimate period determined from a limit cycle of the controlled system;
   adjusting the ultimate gain and the ultimate period to account for a relay hysteresis;
   applying a tuning rule to determine a proportional gain and an integral time from the ultimate gain and the ultimate period;
   updating the HVAC system controller with the proportional gain and integral time; and
   verifying the proportional gain and integral time, comprising:
   setting a performance envelope at least partially determined by the performance coefficient;
   applying a step-input to provoke a closed-loop response; and
   comparing the closed loop response with the performance envelope to determine whether the closed-loop response is within the performance envelope.

2. The method of claim 1, further comprising comparing adjusting the proportional gain and integral time by adjusting the tuning rule by comparison to internal model control (IMC) based results.

3. The method of claim 1, further comprising controlling a fan coil unit with the HVAC system controller.

4. The method of claim 3, wherein controlling the fan coil unit comprises controlling a heating/cooling medium flow rate though a coil of the fan coil unit, a speed of a fan of the fan coil unit, or a combination thereof.

5. The method of claim 1, wherein adjusting the ultimate gain and the ultimate period includes determining an adjustment factor for the ultimate period and the ultimate gain by:
   modeling the controlled system as a first order plus dead time system; and
   averaging an adjustment factor of a range of ratios of time delay versus time constants of the controlled system.

6. The method of claim 5, wherein the range of time delay to time constant ratio is between about 0.1 and about 0.5.

7. The method of claim 1, wherein setting the performance envelope comprises determining:
   a maximum overshoot as a function of the performance coefficient;
   a first time point that is larger than an apparent time delay of the HVAC system;
   a second time point that is equal to an apparent time delay plus a peak time of the HVAC system and is greater than the first time point;
   a third time point that is a time constant of an exponential term that bounds sluggishness of the closed-loop response moving to a steady state;
   a fourth time point that is a time constant of an exponential term that bounds how fast the closed-loop response moves to steady state; and a fifth time point that is a response monitoring time termination for the exponential terms.

8. The method of claim 7, wherein:
the maximum overshoot is about 0.5 minus about 0.35 times the performance coefficient;
the first time point is 1.5 times the time delay;
the second time point is about 4.6 times the time delay;
the fourth time point is about 5 times the time delay minus about 3.5 times the performance coefficient times the time delay; and
the fifth time point is the lesser of the time delay plus three times the third time and the time delay plus three times the fourth time.

9. The method of claim 7, further comprising estimating the delay time as about 0.3 times the ultimate period.

10. The method of claim 7, wherein determining the fourth time includes estimating a ratio of a natural frequency divided by an ultimate frequency over a range of the ratios of the time delay divided by the time constant across at least three tuning cases.

11. A heating, ventilation and air conditioning (HVAC) system, comprising:
a fan coil unit including a fan and a coil;
a duct extending between the fan coil unit and a volume of air contained in a zone;
a sensor disposed in or proximal to the volume of air and configured to sense an air temperature of a zone; and
a controller coupled to the fan coil unit and the sensor, the controller being configured to receive a signal from the sensor and provide a signal to the fan coil unit so as to regulate at least one of supply air temperature, heating/cooling medium flowrate, wherein the controller includes an input device that is selectable to provide a performance coefficient to the controller such that when the controller is autotuned, a result of the autotuning is compared against a performance envelope determined at least partially by the performance coefficient;
an autotuner relay providing a step-input to the controlled system to measure an ultimate gain and an ultimate period of the controlled system, the autotuner relay taking control from the controller and providing a periodic step function to the controlled system to determine limits of the controlled system, the ultimate gain and the ultimate period determined from a limit cycle of the controlled system.

12. The HVAC system of claim 11 wherein the controller includes a proportional-integral (PI) controller and the HVAC system further comprises a control feedback loop including the PI controller, a controlled system including the fan coil unit and the sensor, and the autotuner relay disposed in parallel to the PI controller.

13. The HVAC system of claim 12, wherein the input device is configured to set the performance coefficient α of between about 0 and about 1, wherein the controller sets the performance envelope with a maximum overshoot Mp of 0.5-0.35a, wherein:

$$M_p = e^{-\zeta\pi/\sqrt{1-\zeta^2}}.$$

14. The HVAC system of claim 13, wherein the controller sets the performance envelope using a plurality of time points, the plurality of time points including:
a first time point that is larger than an apparent time delay of the HVAC system;
a second time point that is equal to an apparent time delay plus a peak time of the HVAC system;
a third time point that is a time constant of an exponential term that bounds sluggishness of the closed-loop response moving to a steady state;
a fourth time point that is a time constant of an exponential term that bounds how fast the closed-loop response moves to steady state; and
a fifth time point that is a response monitoring time termination for the exponential terms.

15. The HVAC system of claim 14, wherein:
the first time point is 1.5 times the time delay;
the second time point is about 4.6 times the time delay;
the fourth time point is about 5 times the time delay minus about 3.5 times the performance coefficient times the time delay; and
the fifth time point is the lesser of the time delay plus three times the third time and the time delay plus three times the fourth time.

* * * * *